US005743247A

United States Patent [19]
Kingsley et al.

[11] Patent Number: 5,743,247
[45] Date of Patent: Apr. 28, 1998

[54] METHOD AND APPARATUS FOR SAFE OPERATION OF SELF PROPELLED CONCRETE SAW

[75] Inventors: Michael G. Kingsley, Independence; Kevin R. Wilson, Blue Springs, both of Mo.

[73] Assignee: Diamant Boart, Inc., Olathe, Kans.

[21] Appl. No.: 528,849

[22] Filed: Sep. 15, 1995

[51] Int. Cl.$^6$ .................................................. B28D 1/04
[52] U.S. Cl. .......................... 125/12; 299/39.3; 192/8 R; 192/4 A; 404/94; 188/171; 188/31
[58] Field of Search ................... 125/13.01, 12; 299/39.3; 451/352; 192/4 R, 4 A, 9, 8 R; 477/93, 92, 200, 199; 404/93, 94; 188/171, 31

[56] References Cited

U.S. PATENT DOCUMENTS

| | | | |
|---|---|---|---|
| 1,047,329 | 12/1912 | Sundh | 192/4 A |
| 1,555,724 | 9/1925 | Tuppen | 188/171 |
| 2,244,742 | 6/1941 | Tyson | 299/39.3 |
| 2,973,950 | 3/1961 | Tucker | 299/39.3 |
| 3,417,638 | 12/1968 | Haase et al. | 299/39.3 |
| 4,310,198 | 1/1982 | Destree | 125/14 |
| 4,333,685 | 6/1982 | Arnswald | 299/39.3 |
| 5,305,729 | 4/1994 | Chiuminatta et al. | 125/12 |

FOREIGN PATENT DOCUMENTS 942653  11/1963  United Kingdom ................. 188/171

OTHER PUBLICATIONS

"Floor Cutters" by Lissmac, published during 1985.
"Operating Instructions— Parts List for Super Quadramatic Concrete/Asphalt Saws", published by Target Products, Inc., Kansas City, Missouri, May of 1990.

"Concut —Concrete Sawing, Safety Grooving & Bumpcutting Equipment" brochure distributed by Concut, Inc. of Kent, Washington, distributed in 1984.
"Target Safetrac Systems Rebuilding America's Infrastructure" brochure published by Target Products, Inc., Kansas City, Missouri, Aug. of 1985.

*Primary Examiner*—Robert A. Rose
*Attorney, Agent, or Firm*—Joseph B. Bowman

[57] ABSTRACT

A concrete saw is provided which utilizes a transmission having both forward and reverse, high and low speed ranges separated by a neutral state. The transmission includes a neutral start switch which prevents the engine from being started, while the transmission is in gear. An automatic parking brake assembly is mounted to the frame proximate the drive wheel. The brake assembly fixedly engages the drive wheel when the ignition switch is turned to the off position, when the battery is disengaged or when the battery is dead. The brake assembly also immobilizes the drive wheel whenever the transmission is shifted to the neutral state regardless of the position of the ignition switch. The system is provided with an override switch to bypass the automatic application of the brake assembly when the transmission is placed in neutral to facilitate winching or otherwise rolling the saw without engine power. Normally, the brake assembly disengages when the transmission is shifted from neutral into gear. Even when the brake override switch is activated, the brake is automatically engaged when the engine ignition switch is turned off or the emergency override switch is activated. The brake is disengaged only when the engine start switch is turned on. An override switch is provided which, when applied, stops the engine, blade and engages the parking brake. An electrically controlled hydraulic system for raising and lowering the saw blade is rendered inoperative when the engine start switch is turned to the off position or when the battery fails.

31 Claims, 4 Drawing Sheets

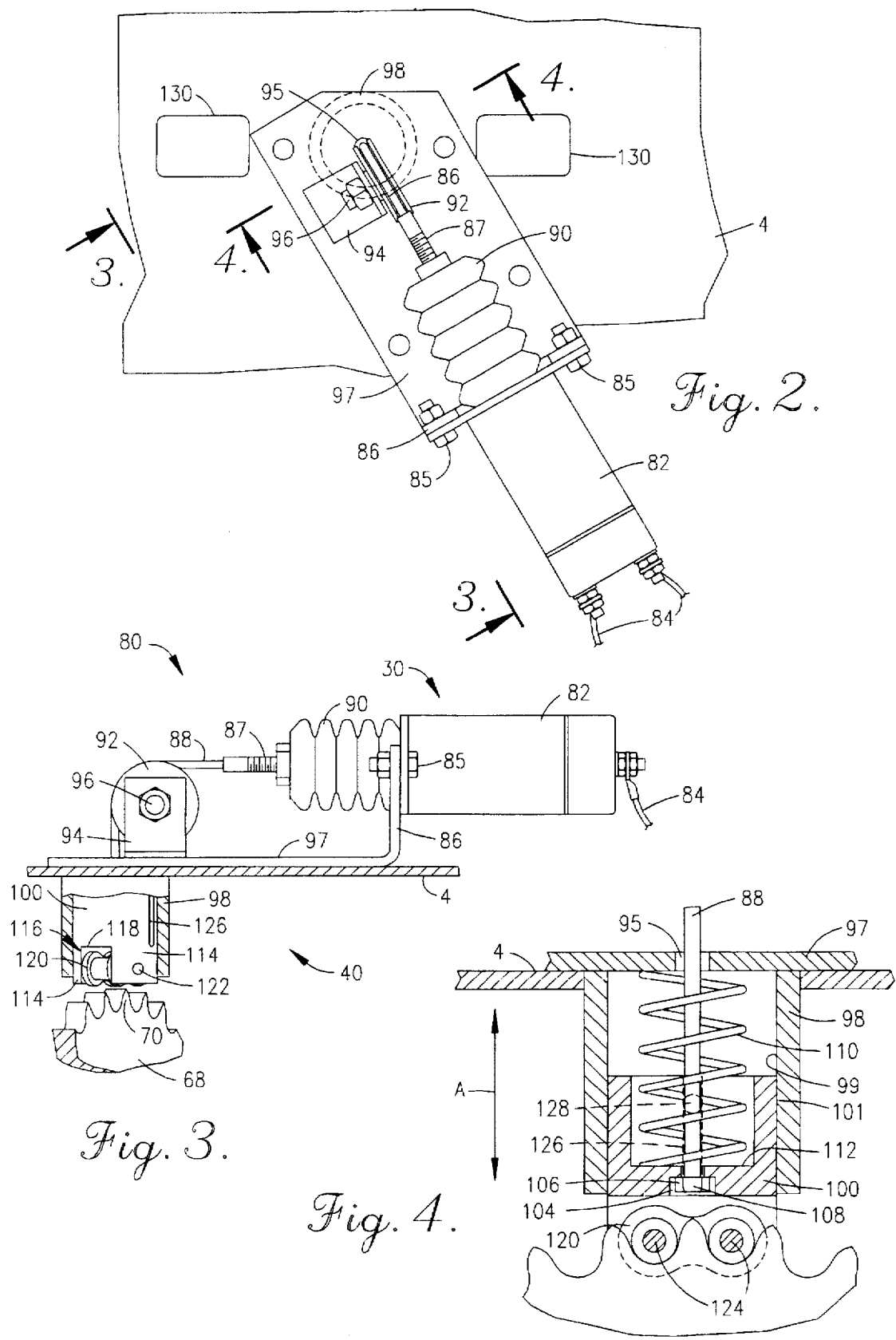

METHOD AND APPARATUS FOR SAFE OPERATION OF SELF PROPELLED CONCRETE SAW

CO-PENDING APPLICATION

Applicants of the present invention are joint inventors of a co-pending application Ser. No. 08/370,374, filed Jan. 9, 1995, entitled "Self Propelled Saw". The '374 application is commonly owned by the assignee of the subject application. The '374 application is incorporated herein by reference.

FIELD OF THE INVENTION

The present invention relates to an industrial concrete saw, and in particular, to safety features and modes of safe operation for a large, self propelled concrete saw.

BACKGROUND OF THE INVENTION

In the concrete industry, when building bridges, buildings, roads and the like, it is often necessary to pour large horizontal slabs of concrete. Once poured, it is desirable to machine the slab. Such machining may include cutting seams completely through the slab to form expansion joints and to allow for foundation shifting, cutting notches partially into the slab to control stress cracks as the slab cures, cutting multiple grooves into the slab to create a high friction surface such as for bridges, grinding the surface of the slab and the like. Various types of concrete saws may be utilized to carry out these machining tasks. In industrial applications, large self propelled saws are used which are powered in a variety of manners, such as by gasoline, diesel, electric, propane, and natural gas engines mounted on the saw. While performing a cut, the operator walks behind the saw to control the direction, cutting speed, cutting depth and the like.

Self propelled concrete saws are mounted upon rear drive wheels and upon a hinged front axle assembly which hydraulically raises and lowers the front end of the saw. The front axle assembly includes a height adjustment cylinder that is attached to a front axle assembly having the front wheels thereon. The front axle assembly pivots downward away from, and upward toward, the saw frame when the cylinder extends and retracts thereby raising and lowering the saw. The saw blade is mounted upon a blade support shaft proximate the front of the saw, and thus, as the front end is raised and lowered, the cut depth is varied.

Conventional self propelled saws typically utilize a drive mechanism interconnecting the engine and drive wheels for operating the saw at a fixed travel speed. The drive mechanism may include a variable speed hydrostatic pump and motor which is adjustable in rotational speed and rotational direction. The hydrostat is attached, via gears and a chain to the drive wheels. This conventional drive mechanism affords the operator a single operating range dependent upon the gear combination between the drive wheel and the motor.

Often it is desirable to drive the saw at a slow ground speed, such as when effecting deep cuts, wherein the ground speed is adjustable in extremely small increments. At other times, it is desirable to drive the saw at a high ground speed, such as when effecting shallow cuts or moving between cuts.

The conventional drive mechanism afforded a single operating range for the ground speed. Hence, when the operator desired to change between low and high ground speeds, the operator must change the gears or sprockets upon one or both of the drive motor and drive wheels. By changing these sprockets, the operator was able to change the gear ratio and thus the ground speed. This mechanical change was time consuming and undesirable.

The present inventors are joint inventors of a self-propelled saw disclosed in application Ser. No. 08/370,374 having a transmission which affords high and low gear ranges with a neutral state therebetween. When in the neutral or disengaged state, the transmission allows the wheels to rotate freely. The neutral state allows the user to move the saw without engine power, such as when loading the saw for transport.

However, the neutral state of the transmission creates a potential safety hazard because of the size and weight of the saw. For instance, the user may accidentally leave the transmission in its neutral state after turning off the saw. When in neutral and with the blade raised, the saw may accidentally roll if located on a sloped surface, thereby causing property damage or personal injury. Furthermore, saws containing a neutral state within the transmission are more easily stolen and vandalized. The thief need only shift the transmission to the neutral state in order to move the saw as desired without powering the engine.

Conventional saws characteristically utilize a hydraulic system to lift and lower the saw blade. The hydraulic system utilizes a hydraulic pump which is electrically powered to supply hydraulic fluid to the lifting cylinder in order to raise the saw. Such hydraulic systems utilize a mechanical relief valve to release fluid from the lifting cylinder and lower the saw. The mechanical valve allows the saw to be lowered independent of the hydraulic pump. Thus, to raise the saw the user must move the control lever to the raising position to supply battery power to the hydraulic pump. To lower the saw, the user need only move the control lever to the lowering position which releases a mechanical valve to lower the lifting cylinder.

Unfortunately, hydraulic systems heretofore used on industrial concrete saws have presented significant safety concerns. When the saw blade is raised and the engine is shut off, the blade may be lowered, either intentionally or accidentally, by dropping the pressure in the hydraulic system. Because of the size and height of the equipment, even a nonrotating saw blade is capable of causing injury or property damage when lowered. Once lowered, the hydraulic pressure must be restored to raise the blade. This may be done by starting the engine or by powering the hydraulic pump through the battery. If the battery is weak or dead, the blade cannot be raised and an emergency situation can result.

Conventional hydraulic systems for concrete saws operate independent of the key switch. Hence, the saw may be raised and lowered regardless of whether the key is inserted and the position of the ignition switch. This independent operation allows the saw to be raised and lowered accidentally or by unauthorized persons while attempting to vandalize or steal the saw.

Finally, conventional saws do not offer a fast and effective way to simultaneously stop the engine, blade and transmission when an emergency arises.

A need remains within the industry for a concrete saw with increased safety features. It is an object of the present invention to meet this need and to overcome the hazards experienced heretofore.

SUMMARY OF THE INVENTION

According to the present inventions a concrete saw is provided which utilizes a transmission having both forward and reverse, high and low speed ranges separated by a neutral state. The transmission includes a neutral start switch which prevents the engine from being started, while the transmission is in gear. An automatic parking brake assembly is mounted to the frame proximate the drive wheel. The brake assembly fixedly engages the drive wheel when the ignition switch is turned to the off position, when the battery is disengaged or when the battery is dead. The brake assembly also immobilizes the drive wheel whenever the transmission is shifted to the neutral state regardless of the position of the ignition switch. The system is provided with an override switch to bypass the automatic application of the brake assembly when the transmission is placed in neutral to facilitate winching or otherwise rolling the saw without engine power. Normally, the brake assembly disengages when the transmission is shifted from neutral into gear. Even when the brake override switch is activated, the brake is automatically engaged only when the engine ignition switch is turned off. The brake is disengaged only when the engine start switch is turned on. Thus, the parking brake assembly requires the key to be inserted and turned to the on position before allowing the saw to be moved. An emergency stop switch is provided which, when applied, stops the engine, blade and transmission. The present invention is further characterized by the use of an electrically controlled hydraulic system for raising and lowering the saw blade. The hydraulic system is rendered inoperative when the engine smart switch is turned to the off position or when the battery fails, thereby preventing the saw from being raised or lowered accidentally or by unauthorized persons.

BRIEF DESCRIPTION OF THE DRAWINGS

The objects and features of the invention noted above are explained in more detail with reference to the drawing, in which like reference numerals denote like elements and in which:

FIG. 2 illustrates a top plan view of an automatic brake assembly located proximate a drive wheel according to the present invention;

FIG. 3 illustrates a side view, partially sectional, of an automatic brake assembly taken along line 3—3 in FIG. 2 in the direction of the arrows;

FIG. 4 illustrates a sectional view of an automatic brake assembly taken along line 4—4 in FIG. 2 in the direction of the arrows;

DETAILED DESCRIPTION OF THE INVENTION

Figure 1:
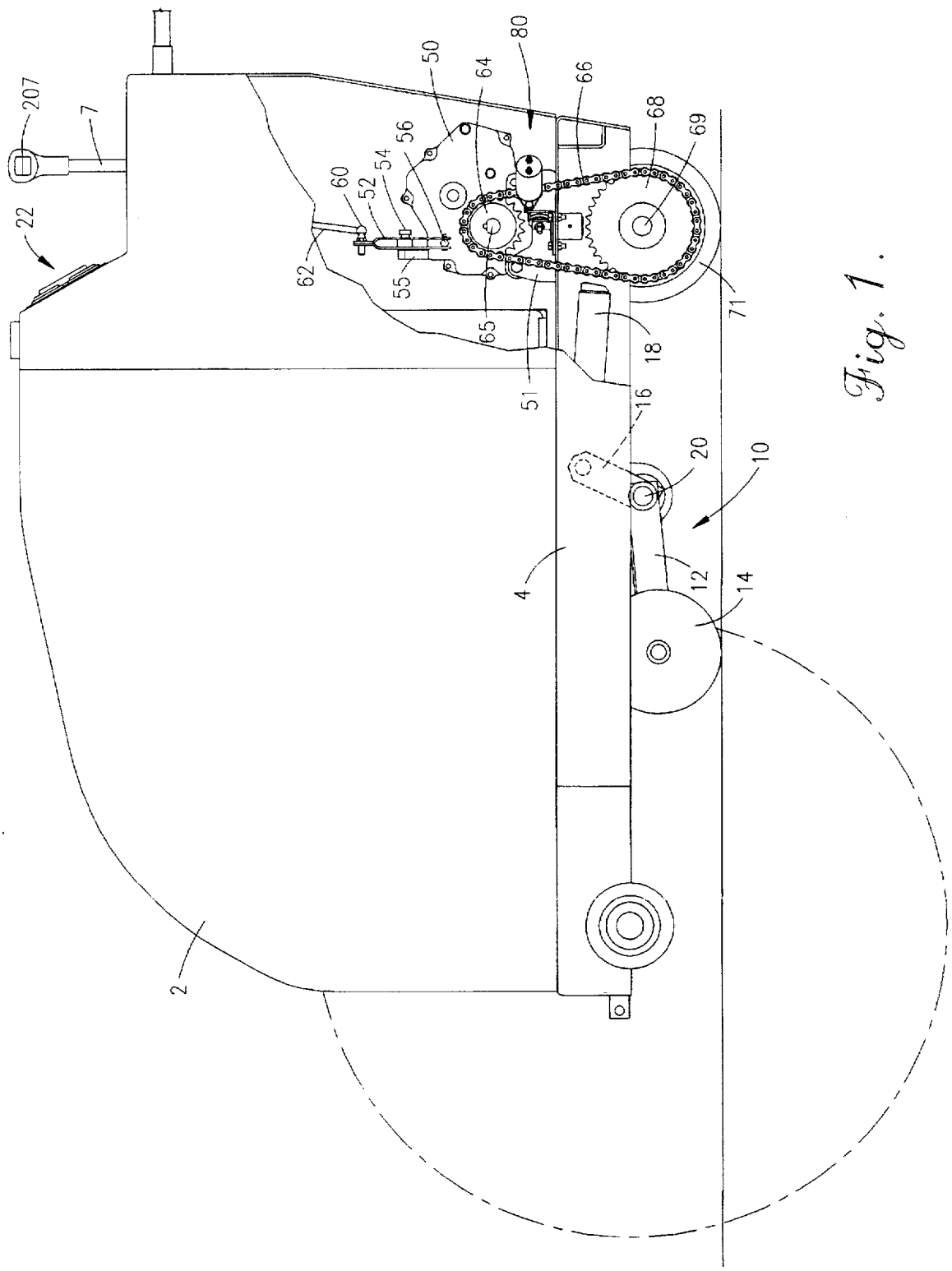
FIG. 1 illustrates a side elevational view of a concrete saw according to the present invention while in a lowered position.

FIG. 1 generally illustrates a concrete saw according to the present invention having an engine covered with a cowling 2 and mounted to a frame 4. The present invention may be utilized with a variety of concrete saw designs including, but not limited to, the saw design referenced above in co-pending application Ser. No. 08/370,374 which is incorporated herein by reference. As the '374 application describes the internal details of the lifting assembly and drive assembly, these details are not repeated hereafter.

Generally speaking, the engine provides power both to rotate the saw blade and to operate, through a transmission, the drive wheels which propel the saw.

Figure 6:
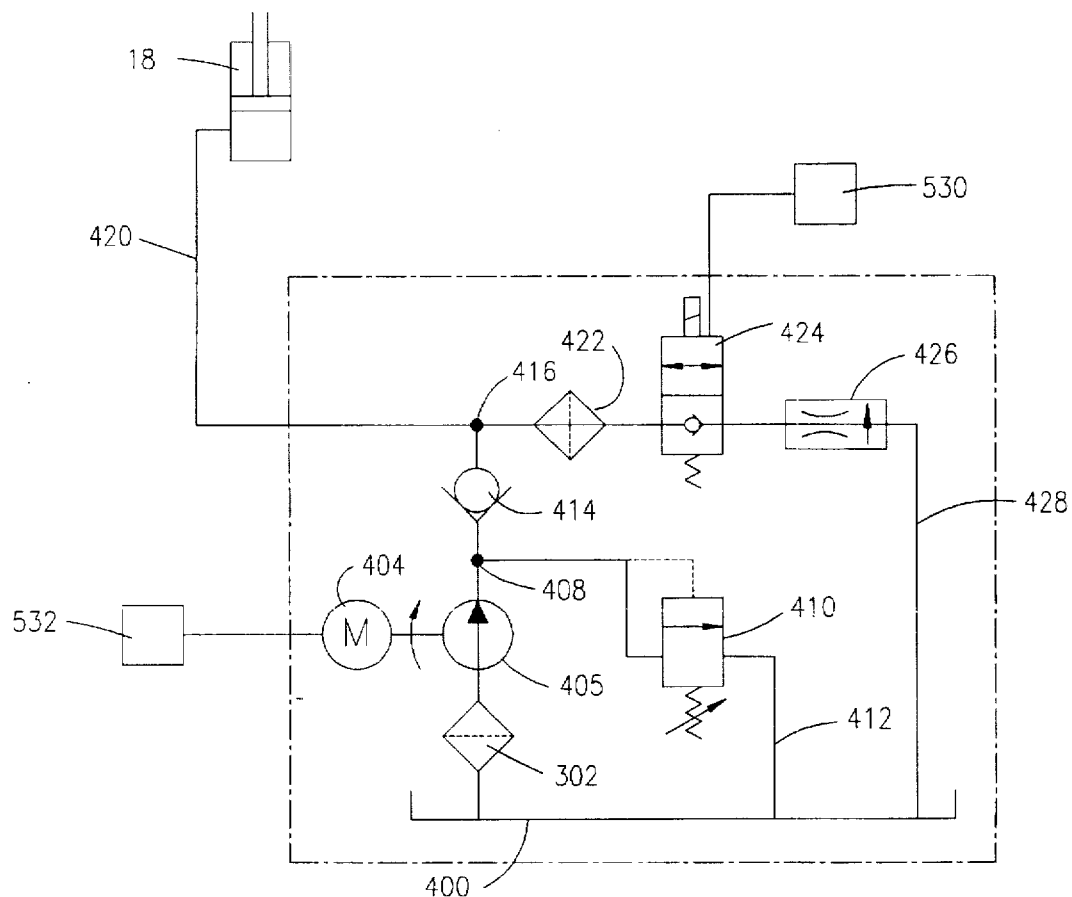
FIG. 6 illustrates a schematic diagram of the hydraulic system.

The frame 4 is mounted to a front axle assembly 10 having forward legs 12 which rotatably support front wheels 14 thereon. The wheels 14 support the forward end of the saw and control the depth to which the saw blade is lowered. The legs 12 are fixedly mounted at the rear end to push brackets 16 which are, in turns attached to the piston of a cylinder 18. The push brackets 16 and legs 12 pivotally rotate about a pivot pin 20. The cylinder 18 extends and contracts to effect pivotal movement of the push brackets 16 which in turn drive the legs 12 upward and downward to raise and lower the saw blade between non-cutting and cutting positions, respectively. The cylinder 18 may be a hydraulic cylinder and the like which is powered from a hydraulic pump (FIG. 6). The hydraulic pump is electrically powered by a battery and is explained below.

Figure 7:
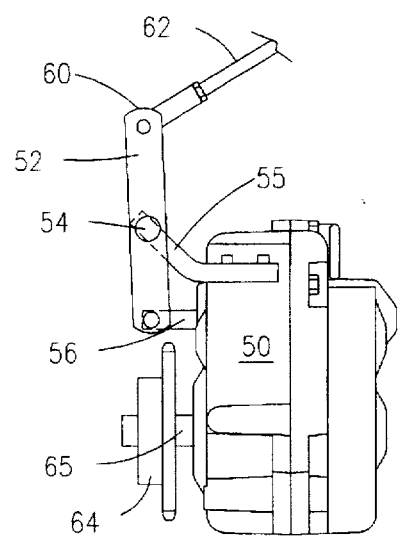
FIG. 7 illustrates a rear end view of the transmission.

With reference to FIGS. 1 and 7, a drive assembly is provided with a transmission 50 mounted to the frame through a bracket 51 proximate the rear end thereof. The transmission 50 is driven by a hydraulic motor (not shown) which receive fluid from a hydrostatic pump via hydraulic lines connected therebetween. The transmission 50 may represent a two-speed transmission with high and low ranges separated by a neutral state. The transmission 50 is driven at variable rates in forward and reverse directions dependent upon the fluid flow rate. The drive direction and speed of the hydraulic motor are determined by the fluid flow rate and direction from the hydrostatic pump. The hydrostatic pump represents a variable displacement pump, the volumetric displacement of which varies as a control lever (not shown) is moved. The fluid flow direction from the hydrostatic pump is also controlled by the control lever 7. The transmission 50 is shifted between high and low gear ranges via the control lever 7 as the control lever is moved laterally within a gear pattern. When in gear, the transmission 50 engages the engine with the drive assembly to transmit engine power to the drive assembly. When shifted to the neutral state, the transmission 50 disengages the engine from the drive assembly to permit free movement of the saw.

The transmission 50 is attached, through a connecting arm 62, to a shifting linkage 52 which toggles clockwise and counterclockwise about a pivot pin 54 extending from a bracket 55 mounted to the transmission 50. The lower end of the linkage 52 is pivotally secured to an outer end of a shifting shaft 56. The shaft 56 slides in opposite directions along its longitudinal axis. The inner end of the shaft 56 engages a shifting gear within the transmission to shift between high and low ranges.

An upper end of the linkage 52 includes a ball joint 60 mounted thereto which is pivotally secured to a lower end of a connecting arm 62. The connecting arm extends upward to a shifting assembly moved by tile control lever 7. As the control lever 7 shifts between high and lower ranges, the connecting arm 62 is moved reciprocally along its longitudinal axis to drive the shifting linkage 52 along a rotational path about the pivot pin 54. In this manner, as the control lever 7 is shifted, the shifting shaft 56 is slid along its longitudinal axis to shift the gears within the transmission 50.

The transmission 50 includes a drive gear 64 mounted to a drive shaft 65 and located upon one end of the transmission. The drive gear 64 drives a driven gear 68 via a chain 66. The gear 68 is securely fixed to axle 69 which in turn powers the drive wheels 71. A brake assembly 80 is provided to immobilize the drive assembly and automatically prevent movement thereof whenever the transmission 50 is shifted to the neutral state. The brake assembly 80 further operates to prevent movement of the drive assembly when the engine power is turned off. The brake assembly 80 is controlled as explained below in connection with the position of the transmission 50 and the settings upon the instrument and control panel 22.

FIGS. 2–4 illustrate the brake assembly 80 in more detail and are referenced in connection with the following explanation thereof.

Turning to FIG. 3, the brake assembly 80 includes engaging means 40 for engaging the teeth 70 of the driven gear 68 and releasing means 30 for biasing the engaging means 40 to a disengaged position remote from the gear 68. The release means 30 may be controlled to allow movement of the drive assembly when the transmission is shifted to the neutral state, but only when the engine is switched to an on state. The releasing means 30 includes a solenoid 82 excited between extended and contracted positions via electrical leads 84. The solenoid 82 is mounted to an L-shaped bracket 86, via bolts 85, and bolted to a platform 97 upon the frame 4. The solenoid 82 includes a piston extending into a flexible bellows 90 and attached at its outer end to a cable 88. The cable 88 passes through a pulley 92 which is mounted via bracket 94 and a pivot shaft 96 to the L-shaped bracket 86. The cable 88 extends through an opening 95 through the base platform 97 of the bracket 86 (FIG. 4).

The engaging means 40 include a tubular shell 98 securely mounted to the frame 4 and projecting downward therefrom. The shell 98 has an upper end abutting against the lower surface of the platform 96 within the bracket 86 (FIG. 4). The tubular shell 98 is hollow and slidably receives a cylindrical ram 100. The tubular shell 98 includes an inner diameter 99 which substantially corresponds to an outer diameter 101 of the cylindrical ram 100 to define movement of the cylindrical ram 100 along a longitudinal axis (extending parallel to the directional arrow A).

Turning to FIG. 4, the ram 100 includes a cavity 102 in the backside thereof which communicates with an inner chamber 104. The cavity 102 partially receives a spring 110 which extends between the platform 97 and a base 112 of the cavity 102.

Turning to FIG. 3, the ram 100 includes opposed flanges 114 extending downward from the lower end thereof and spaced apart from one another to form a channel 118 with open opposed ends 116. The channel 118 receives a chain link 120 secured therein via pins 122 extending between the flanges 114 and through the link 120. The link 120 includes cross members 124 spaced apart from one another to securely engage the teeth 70 of the driven gear 68 when in an engaged position.

Optionally, the ram 100 may include at least one slot 126 (FIG. 3) along one side thereof and extending parallel to the direction of movement A. A pin 128 (FIG. 4) may be mounted to the shell 98 and aligned to project inward therefrom to slidably engage the slot 126 to guide movement of the ram 100 and to limit its rotational travel, thereby ensure that the link 120 properly aligns with the tooth 70. Optionally, a threaded linkage 87 (FIG. 3) may be mounted to the upper end of the cable 88 to enable the length of the cable to be adjusted, to adjust the range of travel of the ram 100.

Turning to FIG. 2, the brake assembly 80 is mounted to the frame 4 in a manner to prevent interference with the drive chain 66 which passes through apertures 130 in the frame 4. The brake assembly 80 is mounted to engage directly the final drive of the wheel. Hence, the brake assembly 80 is effective even if the drive chain 66 fails. The engaging means 40 is aligned vertically. When the spring 110 fails, the weight of the ram 100 is sufficient to ensure that the link 120 engages the gear 68.

During operation, the spring 110 continuously biases the ram 100 outward away from the platform 97 toward the gear 68. When the solenoid 82 is energized, the piston therein contracts, thereby drawing the cable 88 upward and slidably moving the ram 100 to a position remote from the gear 68. When the solenoid 82 is deenergized, the spring 110 biases the piston of the solenoid 82 to its outward position until the link 120 engages the teeth 70 of the gear 68.

Figure 5:
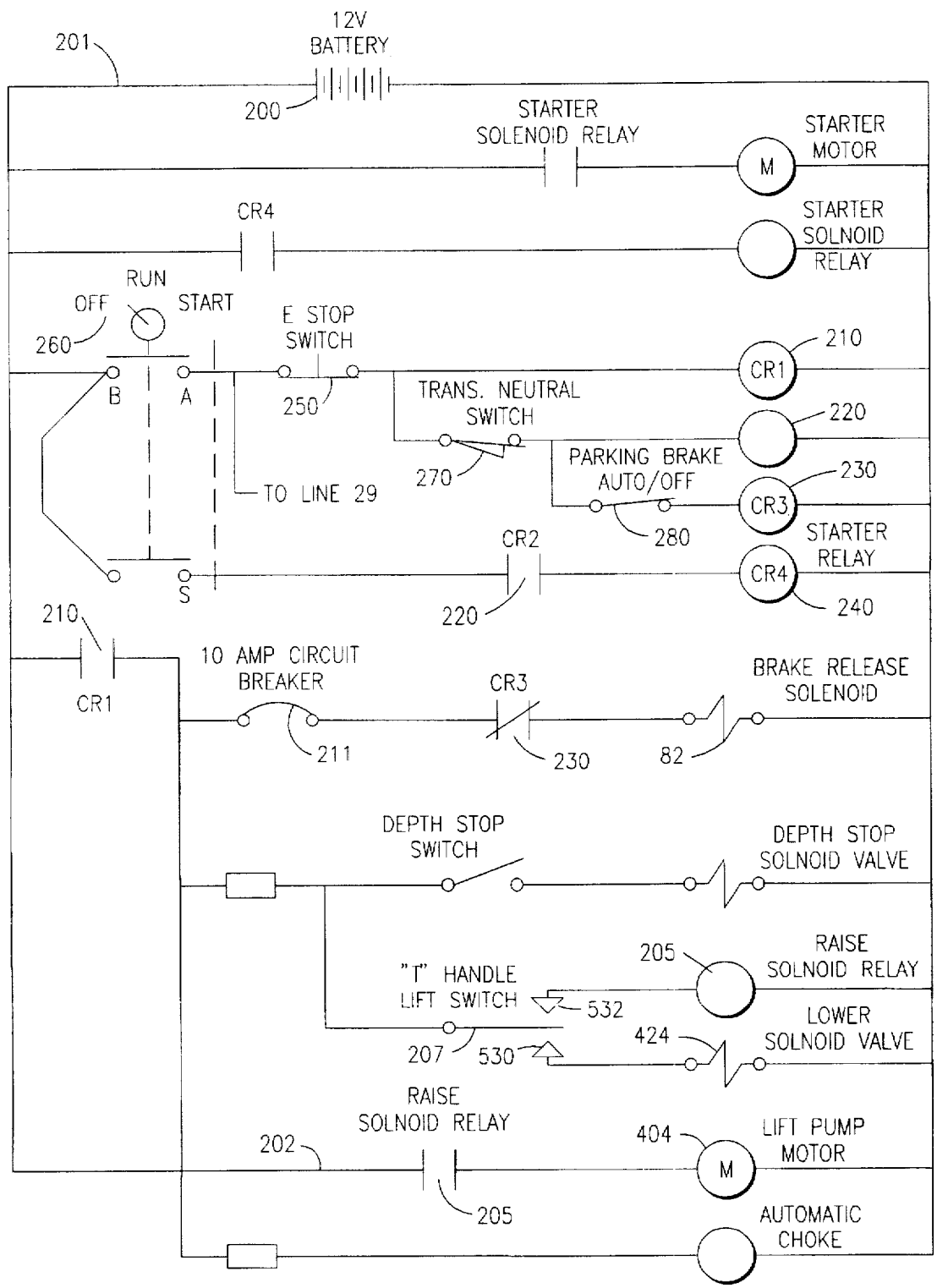
FIG. 5 illustrates a wiring diagram to control the automatic brake assembly and the hydraulic lifting assembly.

FIG. 5 illustrates a partial schematic of the circuitry within the concrete saw to control the automatic parking brake and the hydraulic lifting assembly. Within FIG. 5, a battery 200 delivers power to the system via a common source lead 201. The lead 201 is connected to an ignition switch 260, the solenoid 82, the hydraulic pump motor 404, and the lowering solenoid valve 424. The ignition switch 260 is in turn connected in series to an override switch 250 and a relay 210. A transmission neutral switch 270 is attached to the output of the override switch 250. The neutral switch 270 is closed when the transmission 50 is in neutral. The neutral switch 270 is connected in series to a relay 220. A parking brake bypass switch 280 connected in parallel with the relay 220. The parking brake bypass switch 280 is in turn connected in series to a relay 230. The parking brake bypass switch 280 is closed when the user selects the "auto" state and is open when the user selects the "off" or "bypass" state. The user selects the "auto" state when he/she desires that the parking brake be applied automatically when the transmission is shifted to neutral. The user selects the bypass state when he/she desires that the brake be released when the transmission is shifted to neutral.

The relay 210 is connected in series with a circuit breaker 211, the relay 230 and the brake release solenoid 82. The relay 210 is normally open (i.e., it forms a closed circuit when energized). The relay 230 is normally closed (i.e., it forms an open circuit when energized).

Next, the operation of the parking brake assembly is described in connection with FIG. 5. As explained above, when the solenoid 82 is energized, the parking brake 80 is released. To energize the solenoid 82, the relays 210 and 230 must be closed. The relay 210 is closed only when energized, namely when the override switch 250 is closed and when the ignition switch 260 is turned on. The relay 230 is normally closed and only opened when energized, namely when the parking brake bypass switch 280, transmission neutral switch 270, override switch 250 and ignition switch 260 are closed. Thus, when the ignition switch 260 is turned off, the relay 210 opens, the brake release solenoid 82 is deenergized and the parking brake is applied. When the ignition switch 260 is turned on, the relay 210 is closed. The relay 230 remains closed until all three of the parking brake bypass switch 280, the neutral switch 270 and the override switch 250 are closed. When the switches 250, 270 and 280 are all closed, the relay 230 opens. Hence, if the operator wishes to set the parking brake automatically each time the control lever is moved to the neutral state, the operator sets the parking brake switch to the "auto" position (i.e., closes the parking brake bypass switch 280). Thereafter, when the user moves the control lever 7 to the neutral state, the transmission neutral switch 270 closes thereby energizing relay 230 to create an open circuit and to deenergize the solenoid 82. The user may wish to turn the parking brake off to enable the saw to be moved when in the neutral snare. To do so, the user merely opens switch 280 (i.e., sets the switch 280 to the bypass or off setting) thereby allowing the normally closed relay 230 to become conductive. When relays 210 and 230 are conductive (closed), the solenoid 82 is energized to release the parking brake.

The foregoing circuit configuration and brake assembly provide a system which automatically applies a parking brake when the ignition is turned off and (if desired by the user) automatically when the transmission is shifted to neutral, unless the user turns on a bypass switch.

Turning to FIG. 6, a schematic of the hydraulic system utilized to control the lifting assembly which raises and lowers the saw blade to elevated, non-cutting and lowered, cutting positions, respectively. As explained below, the controller for the lifting assembly prevents raising and lowering of the saw blade whenever the engine is switched to an off state and whenever the electrical power source fails. An oil reservoir is generally illustrated at point 400 which supplies hydraulic fluid to a hydraulic pump 405 via a filter or strainer 302. The pump 405 is driven by a DC motor 404 which is controlled by an electronic rocker switch located upon the control lever 7 (FIG. 1). This switch includes an energizing plate generally designated by the reference numeral 532. The pump 405 outputs fluid to a node 408 which communicates with a control valve 410. The control valve 410 may be set at any desired level such as approximately 2600 psi, wherein it opens when the pressure at node 408 exceeds the preset level. When the fluid pressure exceeds the valve 410 preset level, the hydraulic fluid is returned to the reservoir 400 via the return line 412. From node 408, the hydraulic fluid is delivered to a check valve 414 which operates as a one way valve to deliver hydraulic fluid to its discharge side and not allow reverse direction hydraulic fluid flow.

Fluid from the check valve 414 flows through node 416 to a hydraulic line 420 which delivers fluid to the lifting cylinder 18. The node 416 further connects with a second strainer or filter 422 which in turn connects with a normally closed solenoid control valve 424 and a flow control safety 426. The flow control safety 426 dictates a maximum flow rate wherein fluid may be returned, via line 428 to the reservoir 400.

The control valve 424 is normally closed until energized by a contact plate 530 within a rocker switch 207 on the control lever. When energized, it allows oil to flow along the return line 428. During operation, when the operator rotates the rocker switch to a lifting position, the switch 207 energizes the contact 532 and activates the motor 404 to drive the pump 405, thereby delivering hydraulic fluid to the lifting cylinder 18 via supply line 420. When the operator desires to lower the saw, the rocker switch 207 is toggled in an opposite direction (i.e. to a lowering state) whereat a contact plate 530 is energized and the normally closed control valve 424 is opened. When open, the control valve 424 allows hydraulic fluid to be discharged from the cylinder 18 and returned to the reservoir 400. Optionally, a second flow rate control valve may be provided within the hydraulic line 420 to set the maximum flow rate with which hydraulic fluid is discharged from the lifting cylinder 18. The flow rate control valve may be variably adjusted by the operator to change the flow rate, thereby changing the rate at which the saw is lowered. The safety flow rate control valve 426 dictates a maximum rate at which the cylinder 18 may be collapsed, thereby setting the maximum lowering rate.

Returning to FIG. 5, the battery 200 is attached via line 202 to a solenoid raising relay 205 which is connected in series with the lifting pump motor 404 used to drive the lifting cylinder 18. The rocker switch 207 for raising and lowering the saw is attached via contact 532 with the solenoid relay 205 and via contact 530 with the lower solenoid control valve 424. When the rocker switch 207 is connected to the solenoid relay 205, the relay 205 is closed, thereby delivering power to the motor 404. When the switch 207 is toggled to the opposite state, it delivers power to the lower solenoid control valve 424 which allows hydraulic fluid to release from the cylinder 18 through lines 420 and 428, thereby lowering the saw. As is clear from FIGS. 5 and 6, the switch 207 only receives power from the battery 200 when the relay 210 is closed. The relay 210 is closed only when the ignition switch 260 is closed. Hence, when the ignition switch 260 is open, the lifting switch 207 is inoperative and thus is unable to raise or lower the saw.

The foregoing system prevents the user from inadvertently lowering the saw when the ignition is turned off or when the battery is dead. Hence, the saw is only lowered when the user similarly has the ability to raise the saw.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method for safely controlling operation of a self propelled concrete saw having an engine to selectively rotate a saw blade, the steps of said method comprising:

switching said engine between on and off power states;

raising said saw blade to an elevated, non-cutting position;

lowering said saw blade to a lowered, cutting position;

preventing said raising and lowering steps whenever said engine is switched to said off power state.

2. The method as in claim 1 further comprising the step of providing an electrical power source for said raising and lowering steps.

3. The method as in claim 2 further comprising the step of preventing said lowering step whenever said electrical power source fails.

4. A method for safely controlling operation of a self propelled concrete saw having an engine selectively connected through a transmission to a drive assembly, the steps of said method comprising:

switching said engine between on and off power states;

providing said transmission with a neutral state to operatively disengage said engine from said drive assembly to permit free movement of said drive assembly;

providing said transmission with a gear state to operatively engage said engine with said drive assembly to transmit power from said engine to said drive assembly;

shifting said transmission between said neutral and said gear states to selectively engage and disengage said engine with said drive assembly;

immobilizing said drive assembly to automatically prevent movement thereof whenever said transmission is shifted to said neutral state; and bypassing said immobilizing step to permit movement of said drive assembly when said transmission is shifted to said neutral state, but only when said engine is switched to said on power state.

5. The method as in claim 4 further comprising the step of overriding said switching, shifting and bypassing steps to lock said drive assembly to prevent movement thereof in emergency situations.

6. The method as in claim 4 further comprising the step of immobilizing said drive assembly to automatically prevent movement thereof whenever said transmission is shifted to said neutral state irrespective of the power state of said engine.

7. The method as in claim 4 further comprising the step of immobilizing said drive assembly to automatically prevent movement thereof whenever said engine is switched to said off power state.

8. The method as in claim 4 further comprising the steps of:
   storing electrical power within a battery; and
   energizing said engine with electrical power from said battery when switching said engine to said on power state.

9. The method as in claim 8 further comprising the step of immobilizing said drive assembly to automatically prevent movement thereof whenever said electrical power within said battery falls below a preselected level.

10. A system for safely controlling operation of a self propelled concrete saw having an engine selectively connected through a transmission to a drive assembly, the transmission having a neutral state to operatively disengage the engine from the drive assembly and having a gear state to operatively engage the engine with the drive assembly, the improvement comprising:
    means for shifting the transmission between the neutral and gear states to selectively engage and disengage the engine with the drive assembly; and
    immobilizing means for automatically preventing movement of the saw when said shifting means shifts the transmission to the neutral state, wherein said immobilizing means includes a ram which physically engages a gear located proximate a wheel of the saw, said ram preventing said gear from turning when engaged.

11. A system according to claim 10, wherein said immobilizing means includes securing means to mechanically engage the drive assembly to prevent movement of the saw.

12. A system according to claim 10, wherein said immobilizing means includes release means, electrically energized, to release said immobilizing brake means.

13. A system according to claim 10, said improvement further comprising ignition means for switching the engine between on and off states, said immobilizing means including means for automatically preventing movement of the saw when said ignition means switches the engine to said off state.

14. A system according to claim 10, further comprising a neutral switch for determining when the transmission is in the neutral state, said switch activating said immobilizing means when the transmission is in the neutral state.

15. A system according to claim 10, further comprising bypass means for bypassing said immobilizing means when the transmission is in the neutral state, said bypass means permitting movement of the drive assembly when the transmission is shifted to the neutral state.

16. A system for safely controlling operation of a self propelled concrete saw having an engine selectively connected through a transmission to a drive assembly, the transmission having a neutral state to operatively disengage the engine from the drive assembly and having a gear state to operatively engage the engine with the drive assembly, the improvement comprising:
    means for shifting the transmission between the neutral and gear states to selectively engage and disengage the engine with the drive assembly;
    immobilizing means for automatically preventing movement of the saw when said shifting means shifts the transmission to the neutral state; and
    a neutral switch for determining when the transmission is in the neutral state, said switch activating said immobilizing means when the transmission is in the neutral state.

17. A system according to claim 16, wherein said immobilizing means includes securing means no mechanically engage the drive assembly to prevent movement of the saw.

18. A system according to claim 16, wherein said immobilizing means includes release means, electrically energized, to release said immobilizing brake means.

19. A system according to claim 16, wherein said immobilizing means includes a ram which physically engages a gear located proximate a wheel of the saw, said ram preventing said gear from turning when engaged.

20. A system according to claim 16, said improvement further comprising ignition means for switching the engine between on and off states, said immobilizing means including means for automatically preventing movement of the saw when said ignition means switches the engine to said off state.

21. A system according to claim 16, further comprising bypass means for bypassing said immobilizing means when the transmission is in the neutral state, said bypass means permitting movement of the drive assembly when the transmission is shifted to the neutral state.

22. A system for safely controlling operation of a self propelled concrete saw having an engine selectively connected through a transmission to a drive assembly, the transmission having a neutral state to operatively disengage the engine from the drive assembly and having a gear state to operatively engage the engine with the drive assembly, the improvement comprising:
    means for shifting the transmission between the neutral and gear states to selectively engage and disengage the engine with the drive assembly;
    immobilizing means for automatically preventing movement of the saw when said shifting means shifts the transmission to the neutral state; and
    bypass means for bypassing said immobilizing means when the transmission is in the neutral state, said bypass means permitting movement of the drive assembly when the transmission is shifted to the neutral state.

23. A system according to claim 22, wherein said immobilizing means includes securing means to mechanically engage the drive assembly to prevent movement of the saw.

24. A system according to claim 22, wherein said immobilizing means includes release means, electrically energized, to release said immobilizing brake means.

25. A system according to claim 22, wherein said immobilizing means includes a ram which physically engages a gear located proximate a wheel of the saw, said ram preventing said gear from turning when engaged.

26. A system according to claim 22, said improvement further comprising ignition means for switching the engine between on and off states, said immobilizing means including means for automatically preventing movement of the saw when said ignition means switches the engine to said off state.

27. A system according to claim 22, further comprising a neutral switch for determining when the transmission is in the neutral state, said switch activating said immobilizing means when the transmission is in the neutral state.

28. A system for safely controlling operation of a self propelled concrete saw having an engine selectively connected through a transmission to a drive assembly, the improvement comprising:

a transmission having a neutral state to operatively disengage the engine from the drive assembly and having a gear state to operatively engage the engine with the drive assembly;

means for shifting said transmission between said neutral and gear states to selectively engage and disengage the engine with the drive assembly;

immobilizing means for automatically preventing movement of the saw when said shifting means shifts said transmission to said neutral state; and a neutral switch for determining when said transmission is in said neutral state, said switch activating said immobilizing means when said transmission is in said neutral state.

29. The system according to claim 28, further comprising bypass means for bypassing said immobilizing means when said transmission is in said neutral state, said bypass means permitting movement of the drive assembly when said transmission is shifted to said neutral state.

30. A system for safely controlling operation of a self propelled concrete saw having an engine selectively connected through a transmission to a drive assembly, the improvement comprising:

a transmission having a neutral state to operatively disengage the engine from the drive assembly and having a gear state to operatively engage the engine with the drive assembly;

means for shifting said transmission between said neutral and gear states to selectively engage and disengage the engine with the drive assembly;

immobilizing means for automatically preventing movement of the saw when said shifting means shifts said transmission to said neutral state; and bypass means for bypassing said immobilizing means when said transmission is in said neutral state, said bypass means permitting movement of the drive assembly when said transmission is shifted to said neutral state.

31. A system according to claim 30, further comprising a neutral switch for determining when said transmission is in said neutral state, said switch activating said immobilizing means when said transmission is in said neutral state.

* * * * *